(12) United States Patent
Groves

(10) Patent No.: US 6,900,760 B2
(45) Date of Patent: May 31, 2005

(54) ADAPTIVE GPS AND INS INTEGRATION SYSTEM

(75) Inventor: Paul D. Groves, Farnborough (GB)

(73) Assignee: Qinetiq Limited, Farnborough (GB)

(*) Notice: Subject to any disclaimer, the term of this patent is extended or adjusted under 35 U.S.C. 154(b) by 0 days.

(21) Appl. No.: 10/297,663

(22) PCT Filed: May 23, 2001

(86) PCT No.: PCT/GB01/02307
§ 371 (c)(1),
(2), (4) Date: Dec. 9, 2002

(87) PCT Pub. No.: WO01/94971
PCT Pub. Date: Dec. 13, 2001

(65) Prior Publication Data
US 2004/0012522 A1 Jan. 22, 2004

(30) Foreign Application Priority Data
Jun. 7, 2000 (GB) ............................................. 0013722

(51) Int. Cl.⁷ ............................. G01S 5/14; G01C 21/26
(52) U.S. Cl. ................................... 342/357.14; 701/216
(58) Field of Search ....................... 342/357.14; 701/216

(56) References Cited

U.S. PATENT DOCUMENTS

| | | | |
|---|---|---|---|
| 5,398,034 A | 3/1995 | Spilker, Jr. | 342/357.02 |
| 5,416,712 A | 5/1995 | Geier et al. | 701/216 |
| 5,740,048 A | 4/1998 | Abel et al. | 701/200 |
| 5,901,183 A | 5/1999 | Garin et al. | 375/343 |
| 5,983,160 A | 11/1999 | Horslund et al. | 701/213 |
| 6,240,367 B1 * | 5/2001 | Lin | 701/214 |
| 6,278,945 B1 * | 8/2001 | Lin | 701/216 |
| 6,331,835 B1 * | 12/2001 | Gustafson et al. | 342/357.06 |
| 6,516,021 B1 * | 2/2003 | Abbott et al. | 375/150 |

FOREIGN PATENT DOCUMENTS

EP 498655 A2 8/1992

OTHER PUBLICATIONS

McBurney, Paul, "A Robust Approach to Reliable Real-Time Kalman Filtering," PLANS '90, Mar. 1990, pp. 549–556.*

Kaplan et al.; "Understanding GPS—Principles and Applications"; *Artech House Mobile Communications Series*; Boston, Ma; 1996; pp 395–408 (SP002147231).

* cited by examiner

*Primary Examiner*—Gregory C. Issing
(74) *Attorney, Agent, or Firm*—Nixon & Vanderhye P.C.

(57) ABSTRACT

This invention relates to the field of Inertial Navigation Systems (INS) and satellite navigation systems such as the Global Positioning System (GPS) and in particular relates to methods of integrating GPS and INS data in order to provide more accurate navigation solutions. The invention provides a method of improving the accuracy of a tightly coupled integrated INS and satellite radio navigation system in cases where the satellite navigation receiver has adaptive tracking loop bandwidths.

13 Claims, 1 Drawing Sheet

ADAPTIVE GPS AND INS INTEGRATION SYSTEM

This application is the U.S. national phase of international application PCT/GB01/02307, filed in English on 23 May 2001, which designated the U.S. PCT/GB01/02307 claims priority to GB Application No. 0013722.4 filed 7 Jun. 2000. The entire contents of these applications are incorporated herein by reference.

BACKGROUND OF THE INVENTION

1. Field of the Invention

This invention relates to the field of Inertiai Navigation Systems (INS) and satellite positioning systems such as the Global Positioning System (GPS). In particular, this invention relates to methods of integrating INS and GPS data in order to provide more accurate navigation solutions.

2. Discussion of Prior Art

An INS comprises a set of accelerometers and gyroscopes, known as an inertial measurement unit (IMU), together with a navigation equations processor, which integrates the IMU outputs to give the position, velocity and attitude. GPS consists of a constellation of satellites which transmit navigation data to a GPS receiver. User location can be derived from the signals received from four separate satellites. Together, INS and GPS form the core navigation systems of military aircraft and missiles. Note: although the term "GPS" is used throughout the skilled man will appreciate that the invention relates to any satellite navigation system that works along similar principles to GPS, e.g. Galileo. References to GPS should therefore be taken as meaning any satellite system that operates in a GPS-like manner.

Integrating INS and GPS together provides a navigation solution which combines the long term accuracy of GPS with the continuity, high bandwidth and low noise of INS.

There are four basic types of INS/GPS integration technique. An uncoupled system simply uses the GPS data to periodically reset the INS. This approach is crude and, hence, is rarely used A loosely-coupled system compares the GPS navigation solution to that of the INS to estimate errors in both systems using a Kalman filter based algorithm (for more information on the Kalman filter algorithm see *Applied Optimal Estimation* by The Technical Staff of the Analytical Sciences Corporation, editor A Gelb, Massachusetts Institute of Technology Press (1974)). A tightly-coupled system, is similar to the loosely-coupled system but uses the range and range rate data transmitted from each satellite tracked instead of the GPS navigation solution. Finally, a deep integration system combines the GPS receiver tracking functions and INS/GPS integration within a common Kalman filter. This requires the re-design of, amongst other things, the GPS receiver, which requires access to the GPS Receiver Applications Module (GRAM), which is restricted by the US Government. Processor loads in a deep integration system are also high and so this system has a number of drawbacks.

Both loosely-coupled and tightly-coupled systems are in common use. However, tightly coupled systems are more accurate and stable and are the subject of this invention (for further information on GPS/INS integration see *GPS/INS Integration, AGARD Lecture Series LS-207; Systems Implications and Innovative Applications of Satellite Navigation* by R E Phillips and G T Schmidt).

Each navigation satellite transmits carrier signals on two frequencies, known as L1 and L2, each with a pseudo-random code modulated onto it. The GPS receiver will track the code and carrier components of each signal independently. Each receiver will therefore maintain two so-called tracking loops for each satellite signal. Range data (referred to as "pseudo-range" in GPS terminology) is derived from the code signal tracking loop and range-rate data (referred to as "pseudo-range rate") is derived from the carrier signal tracking loop. In normal GPS operation, each carrier tracking loop is used to aid the corresponding code tracking loops. However, carrier tracking loops are more sensitive to interference and will lose lock at lower interference levels than code tracking loops. The position of the receiver can be derived from the pseudo-range information and the velocity of the receiver can be derived from the pseudo-range rate information.

The responsiveness of a GPS receiver is affected by noise (e.g. from interference with the GPS signal) and also by high dynamic vehicle manoeuvres. The bandwidth of the tracking loops is a measure of the frequency with which the receiver outputs independent range and range rate measurements. High bandwidths enable a receiver to track the receiver location more quickly whereas low bandwidths provide greater resistance to interference. It is thus important to select bandwidths carefully in order to maintain satisfactory receiver performance.

In the military environment many GPS receivers are capable of adapting their tracking loop bandwidths in order to respond to changes in the level of vehicle motion and interference.

In an integrated INS/GPS (tightly coupled) system the pseudo-range and pseudo-range rate data from the GPS tracking loops are used as measurement inputs to a Kalman filter. In dual frequency receivers, the outputs from the L1 and L2 tracking channels are combined prior to input to the Kalman filter in order to correct for ionosphere propagation delays. A reversionary mode is usually implemented whereby INS data aids the code tracking loop in the event that the carrier tracking loop loses lock and the GPS receiver is unable to derive range-rate data.

The Kahnan filter is an estimation technique which provides an estimate of the GPS/INS system errors. Part of the Kalman filter technique is the calculation of the so-called Kalman gain matrix ($K_k$) which relates the accuracy of the current measurement to that of the previous estimates of the system errors. In order to correctly calculate the measurement errors in the system the Kalman filter assumes that all measurements have time uncorrelated measurement errors. Gelb defines the Kalman gain matrix ($K_k$) as $$K_k = P_k(-)H_k^T[H_k P_k(-)H_k^T + R_k]^{-1}$$

where $H_k$ is the measurement matrix, $R_k$ is the measurement noise covariance and $[\ ]^{-1}$ denotes the inverse of the matrix.

In fact the errors in successive pseudo-range and pseudo range-rate data are correlated with correlation times inversely proportional to the tracking loop bandwidths. If this fact is not addressed then the Kalman filter becomes unstable, resulting in degraded estimates. Where the Kalman filter corrected INS data is used to aid GPS code tracking, a form of positive feedback can occur which eventually causes the GPS receiver to lose its tracking locks. The navigation solution cannot be resurrected from the INS data alone, where the corrected INS data is used to aid GPS, either because there is no stand alone INS solution or because the INS solution, if available, is not accurate enough. Therefore, where GPS receivers that do not have adaptive bandwidths are used, this problem is circumvented by ensuring that the Kalman filter updates its estimate of the measurement errors at an interval which is greater than the tracking loop measurement correlation time (of the order of 1 second), i.e. the interval between iterations of the Kalman filter measurement update phase is chosen to be greater than the tracking loop measurement correlation time. Since different receivers use different tracking loop bandwidths it is important that the INS/GPS integration Kalman filter is correctly tuned to the appropriate tracking loop bandwidths.

In cases where the receiver has adaptive tracking loop bandwidths tuning of the integration algorithm becomes more difficult. A common approach is to tune the algorithm to a relatively high bandwidth level and disable the Kalman filter measurement inputs when the tracking loop bandwidth drops below a threshold value. This is obviously not an ideal solution since measurement data is being discarded which will inevitably result in a less than optimum navigation solution.

SUMMARY OF THE INVENTION

It is therefore an object of the present invention to provide a method of improving the accuracy of a tightly coupled integrated INS and satellite radio navigation system and to alleviate the above mentioned problems.

Accordingly this invention provides a method of integrating inertial navigation system and satellite navigation system data in a tightly coupled architecture by means of a Kalman filter, the satellite navigation data being received on a receiver having adaptive tracking loop bandwidths, comprising
 i) monitoring the tracking loop bandwidths or modelling them as a function of the receiver measured signal to noise density ratio ($c/n_0$) outputs, and
 ii) varying the rate of response of the Kalman filter to measurements from the satellite navigation system in response to changes in the tracking loop bandwidths such that correlated measurement noise in the Kalman filter is avoided.

It should be noted that the bandwidths of the tracking loops for different satellites are likely to vary independently of one another, particularly where a controlled radiation pattern antenna (CRPA) is used. Therefore, the adaptive inertia/satellite navigation system integration algorithm should be capable of adapting the Kalman filter for each tracking loop.

Where the tracking loop bandwidths are not a direct output of the satellite receiver they may be inferred from the receiver measured signal to noise density ratio ($c/n_0$). The variation of the tracking loop bandwidth with measured ($c/n_0$) is different for each receiver design. It is therefore necessary either to obtain the information from the manufacturer or to infer it from laboratory testing of the receiver using a GPS signal simulator capable of generating interference.

By adapting the Kalman filter to the tracking loop bandwidth the best use of the satellite data is made. There are a number of ways in which the filter can be adapted.

The update interval (iteration rate) of the Kalman filter can be varied. Below a threshold bandwidth the interval between measurement updates from each tracking channel is varied in inverse proportion to the tracking channel bandwidth. Therefore for low bandwidths the iteration rate of the filter can be reduced. As an alternative to this the measurement data can be averaged over the iteration interval provided the averaged measurement is treated as a single measurement for statistical purposes.

Alternatively, the Kalman gain matrix can be weighted down in order to obtain a rate of response of Kalman filter estimates to measurements equivalent to that obtained by increasing the measurement update interval. In this variation of the invention the measurement update interval remains fixed for each measurement type—pseudo-range and pseudo range-rate. When the tracking loop bandwidth drops below a threshold value, to which the update interval is tuned, the Kalman gain matrix is weighted down to simulate increasing the measurement update interval.

The weighting of the Kalman gain matrix can conveniently be achieved by multiplying it by the time between successive (correlated) measurements divided by the time between successive un-correlated measurements.

Weighting of the gain matrix can also be achieved by multiplying it by a suitable adaption matrix. If the Kalman gain matrix is represented as one $n_t$ column matrix for pseudo-range measurements and a second $n_t$ column matrix for pseudo-range rate measurements, where $n_t$ is the number of satellites tracked, then each adaption matrix A is an $n_t \times n_t$ diagonal matrix wherein
 i) for the elements of the pseudo-range adaption matrix

| | | |
|---|---|---|
| $A_{pkii} = 1$ | for | $B_{L\_COi} \geq B_{L\_COT}$ |
| $A_{pkii} = B_{L\_COi}/B_{L\_COT}$ | for | $B_{L\_COi} < B_{L\_COT}$ |
| $A_{pkij} = 0 \quad i \neq j$ | | | where $B_{L\_COi}$ is the code tracking bandwidth of tracking channel i and $B_{L\_COT}$ is the threshold code tracking bandwidth for adaption, and;
 ii) for the elements of the pseudo-range rate adaption matrix

| | | |
|---|---|---|
| $A_{rkii} = 1$ | for | $B_{L\_CAi} \geq B_{L\_CAT}$ |
| $A_{rkii} = B_{L\_CAi}/B_{L\_CAT}$ | for | $B_{L\_CAI} < B_{L\_CAT}$ |
| $A_{rkij} = 0 \quad i \neq j$ | | | where $B_{L\_CAi}$ is the carrier tracking bandwidth of tracking channel i and $B_{L\_CAT}$ is the threshold carrier tracking bandwidth for adaption.

A further way of adapting the Kalman filter is to vary the measurement noise covariance, R, which is a quantity that is varied within the Kalman gain matrix. Either this can be done by multiplying it by the time between successive un-correlated measurements divided by the time between successive (correlated) measurements or by dividing by an adaption matrix analogous to that described above. In the latter case, this involves replacing R within the Kalman gain matrix, $K_k$ with R' where R'=R/A.

An additional way of adapting the Kalman filter is to model the time correlated measurement noise explicitly, either as additional Kalman filter states or as correlated measurement noise using a Schmidt-Kalman filter with Uncertain parameters (for more information on the Schmidt-Kalman filter algorithm see *Stochastic Processes and Filtering Theory* by Andrew H. Jazwinski, Academic Press (1970)). In either case, the correlated measurement noise estimate, $\hat{x}$, is modelled as a first order Markov process, i.e.

$$\frac{d\hat{x}}{dt} = -\frac{\hat{x}}{\tau_c},$$

where the correlation time, $\tau_c$, should be modelled as inversely proportional to the tracking loop bandwidths.

BRIEF DESCRIPTION OF THE FIGURE

An embodiment of the adaptive method of integrating INS and satellite-radio navigation data according to the present invention will now be described with reference to FIG. 1 which depicts an adaptive tightly-coupled INS/GPS integrated navigation system.

DETAILED DISCUSSION OF EMBODIMENTS

Figure 1:
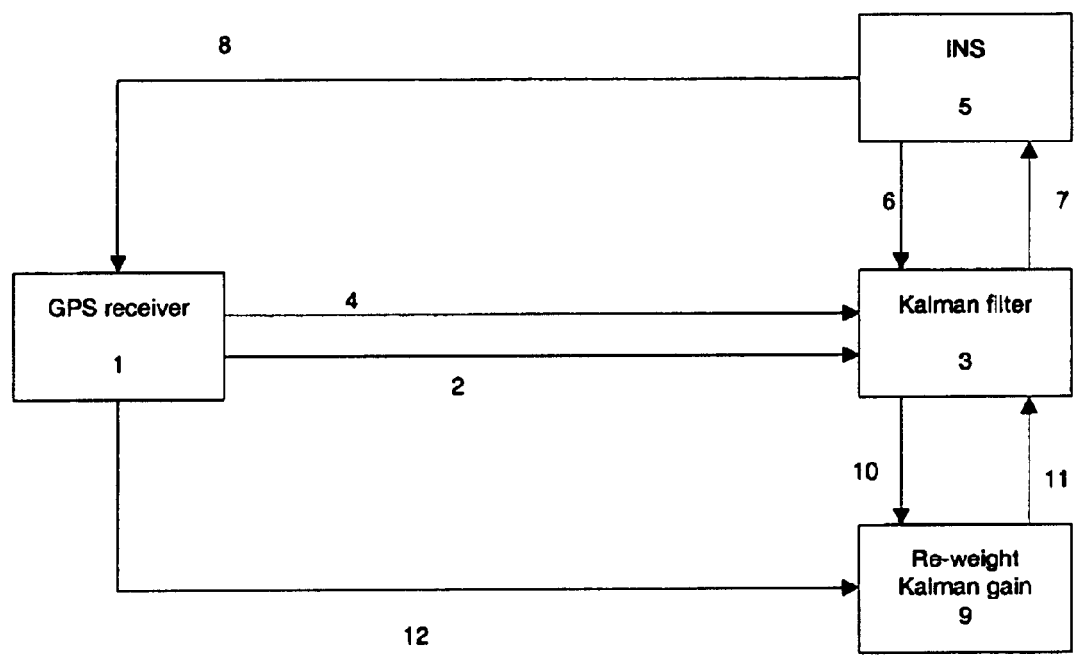

Turning to FIG. 1, a tightly coupled INS/GPS integrated navigation system is shown. A GPS receiver 1 is connected to a Kalman filter 3. An INS 5 is connected to the Kalman filter 3 and also the GPS receiver 1. A Kalman gain re-weighting function 9 is connected to both the Kalman filter 3 and the GPS receiver 1.

In use, the GPS receiver 1 outputs pseudo-range and pseudo-range rate measurements 2 to the Kalman filter 3. It is assumed that these pseudo-range and pseudo-range rate measurements have been combined from the individual L1 and L2 frequency measurements to correct for ionosphere propagation delays. The receiver 1 also sends GPS broadcast navigation data 4 to the Kalman filter 3, which enables the satellite positions, velocities and clock offsets to be calculated.

The INS 5 outputs position, velocity and attitude 6 measurements to the Kalman filter 3. The Kalman filter 3 (in a closed-loop architecture) sends corrections 7 back to the INS 5. These corrections comprise Kalman filter estimates of the INS position, velocity, attitude and inertial instrument errors. The INS 5 uses these to correct its position, velocity and attitude solution and to correct the outputs of its constituent inertial sensors. INS position, velocity and attitude 8 outputs are also sent to the GPS receiver 1, which uses them to aid the code tracking loops of those satellite signals for which carrier tracking cannot be implemented due to low signal to noise ratios.

The Kalman filter 3 comprises a standard tightly-coupled INS/GPS integration algorithm, with the exception that the Kalman gain, K, is re-weighted. The Kalman filter operates a standard system propagation (or prediction) cycle. It operates a standard measurement update cycle up to and including the calculation of the Kalman gain matrices. A Kalman gain re-weighting function 9 takes unweighted Kalman gain matrices 10 computed by the Kalman filter for the current set of pseudo-range measurements and the current set of pseudo-range rate measurements and multiplies weighted Kalman gain matrices 11 which are sent to the Kalman filter. The Kalman filter 3 then resumes the measurement update cycle using the re-weighted Kalman gain matrices.

The Kalman gain re-weighting function 9 calculates the adaptation matrices, A, using the formulae presented above from the tracking loop bandwidths 12 output by the GPS receiver 1. Where the GPS receiver does not output tracking loop bandwidths, an empirical model is inserted between 1 and 9 to estimate the bandwidths 12 as a function of the receiver output ($c/n_0$) measurements.

What is claimed is:

1. A method of integrating inertial navigation system and satellite navigation system data in a tightly coupled architecture by means of a Kalman filter, the satellite navigation data being received on a receiver comprising tracking loops having adaptive bandwidths, comprising
monitoring the tracking loop bandwidths or modelling them as a function of the receiver measured signal to noise density ratio ($c/n_0$) outputs, and
varying the rate of response of the Kalman filter to measurements from the satellite navigation system in response to changes in the tracking loop bandwidths such that correlated measurement noise in the Kalman filter is avoided.

2. A method as claimed in claim 1 wherein the Kalman filter is varied for each tracking loop.

3. A method as claimed in claim 1, wherein the iteration rate of the Kalman filter is varied in inverse proportion to the tracking loop bandwidth.

4. A method as claimed in claim 1, wherein measurement data averaged is averaged over the iteration period.

5. A method as claimed in claim 1, the Kalman filter having a Kalman gain matrix and wherein said Kalman gain matrix is weighted by multiplying it by the time between successive measurements divided by the time between successive uncorrelated measurements.

6. A method as claimed in claim 1, the Kalman filter having a Kalman gain matrix and wherein said Kalman gain matrix is represented as one $n_t$ column matrix for pseudo-range measurements and a second $n_t$ column matrix for pseudo-range rate measurements, where $n_t$ is the number of satellites tracked, and is then weighted by an adaption matrix A, the adaption matrix being an $n_t \times n_t$ diagonal matrix where the elements of the pseudo-range adaption matrix are $$
\begin{array}{lll}
A_{pkii} = 1 & \text{for} & B_{L\_COi} \geq B_{L\_COT} \\
A_{pkii} = B_{L\_COi}/B_{L\_COT} & \text{for} & B_{L\_COi} < B_{L\_COT} \\
A_{pkij} = 0 & i \neq j &
\end{array}
$$

where $B_{L-COi}$ is the code tracking bandwidth of tracking channel i and $B_{L-COT}$ is the threshold code tracking bandwidth for adaption, and;

the elements of the pseudo-range rate adaption matrix are $$
\begin{array}{lll}
A_{rkii} = 1 & \text{for} & B_{L\_CAi} \geq B_{L\_CAT} \\
A_{rkii} = B_{L\_CAi}/B_{L\_CAT} & \text{for} & B_{L\_CAi} < B_{L\_CAT} \\
A_{rkij} = 0 & i \neq j &
\end{array}
$$

where $B_{L-CAi}$ is the carrier tracking bandwidth of tracking channel i and $B_{L-CAT}$ is the threshold carrier tracking bandwidth for adaption.

7. A method as claimed in claim 1, the Kalman filter comprising a Kalman gain matrix having a measurement noise covariance, R, and wherein said measurement noise covariance, R, is divided by an adaption matrix A as claimed in claim 5.

8. A method as claimed in claim 1, wherein the measurement noise covariance, R, is weighted by multiplying by the time between successive uncorrelated measurements divided by the time between successive measurements.

9. A method as claimed in claim 1, wherein the satellite navigation system is a Global Positioning System.

10. A method of integrating inertial navigation system and satellite navigation system data in a tightly coupled architecture by means of a Kalman filter, the satellite navigation data being received on a receiver comprising tracking loops having adaptive bandwidths, comprising
monitoring the tracking loop bandwidths or modelling them as a function of the receiver measured signal to noise density ratio ($c/n_0$) outputs, and
modelling time-correlated measurement noise within the Kalman filter explicitly such that the assumed correlation time within the Kalman filter is varied in inverse proportion to the tracking loop bandwidths.

11. A method as claimed in claim 10 wherein the correlation time is varied independently for measurements from each tracking loop.

12. A method as claimed in claim 10, wherein the correlated measurement noise is estimated as Kalman filter states.

13. A method as claimed in claim 10, wherein the correlated measurement noise is modelled using a Schmidt-Kalman filter algorithm.

* * * * *